April 12, 1927.
G. B. SCHEFFEY
CUT-OFF MECHANISM
Filed Nov. 19, 1925
1,624,367
4 Sheets-Sheet 4
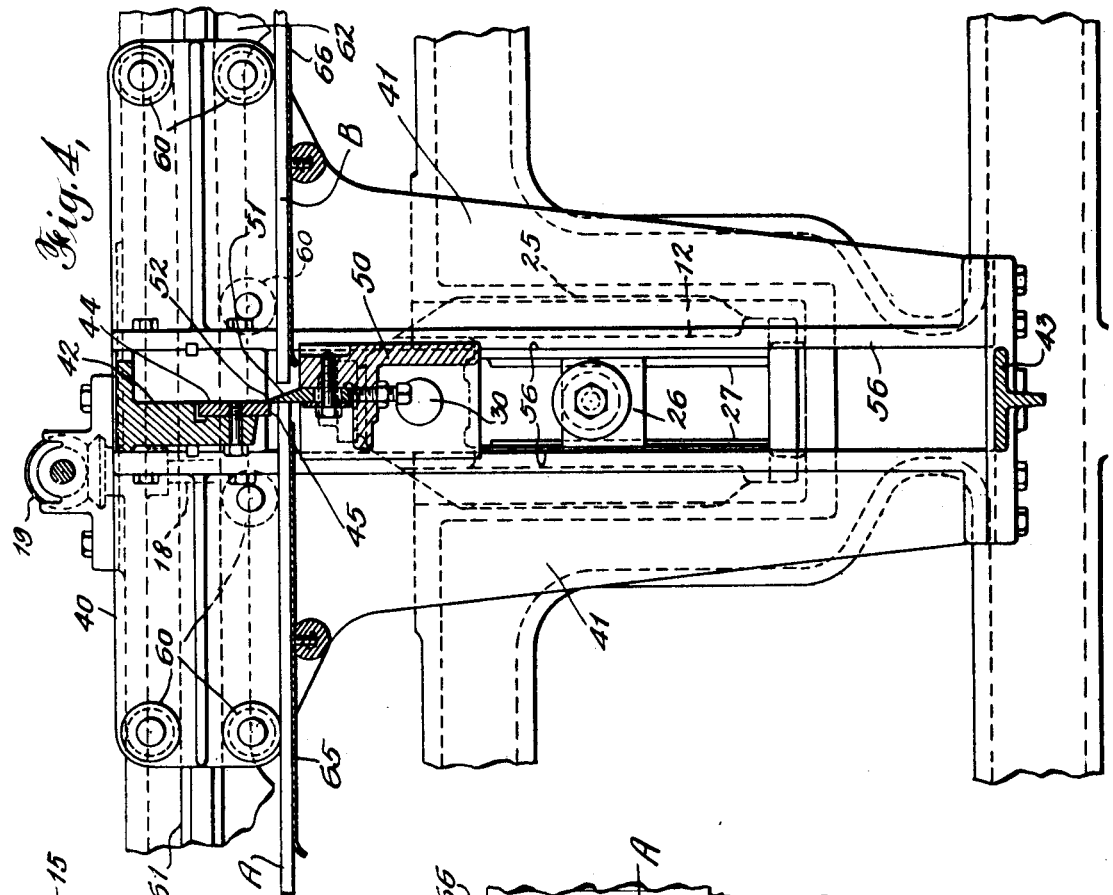
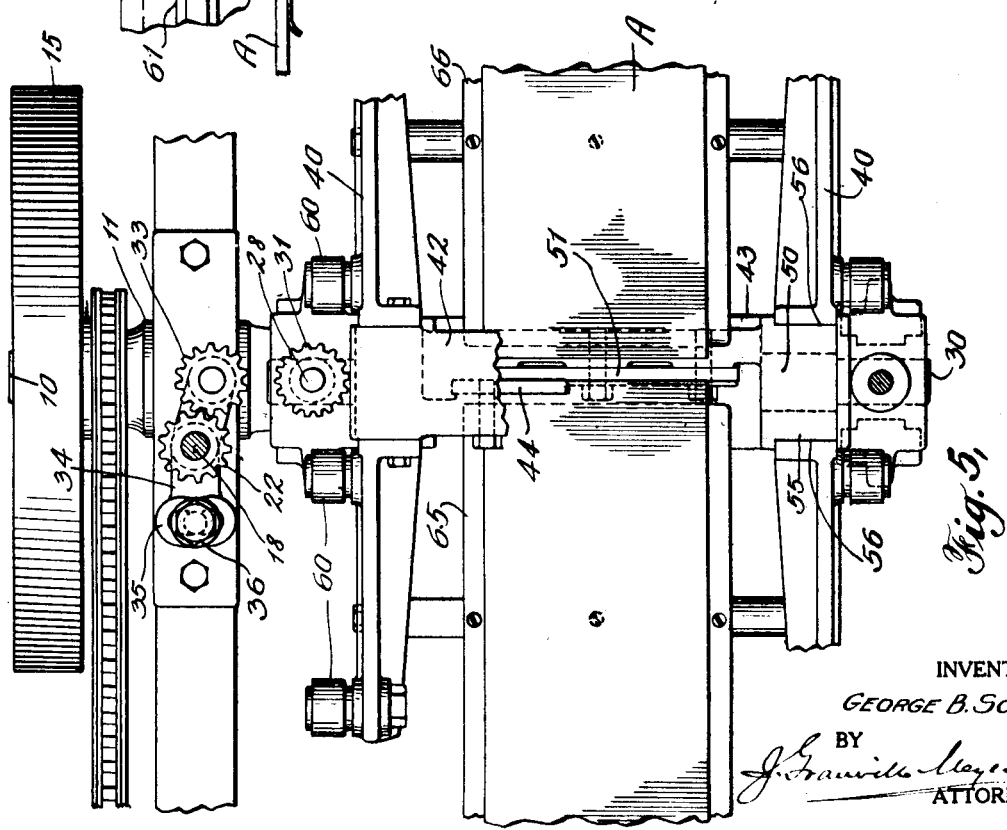
INVENTOR
GEORGE B. SCHEFFEY
BY
J. Granville Meyers
ATTORNEY Patented Apr. 12, 1927.

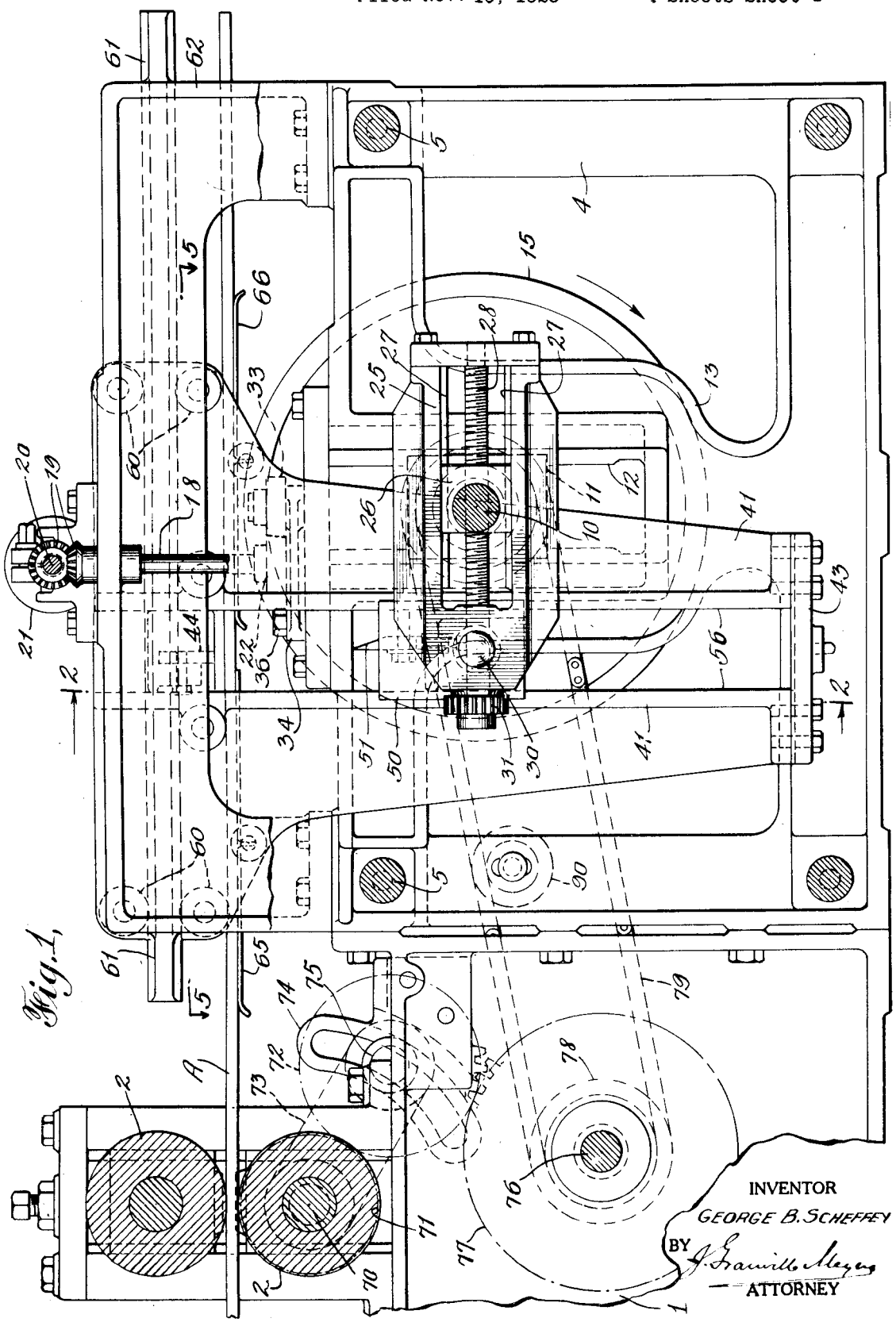

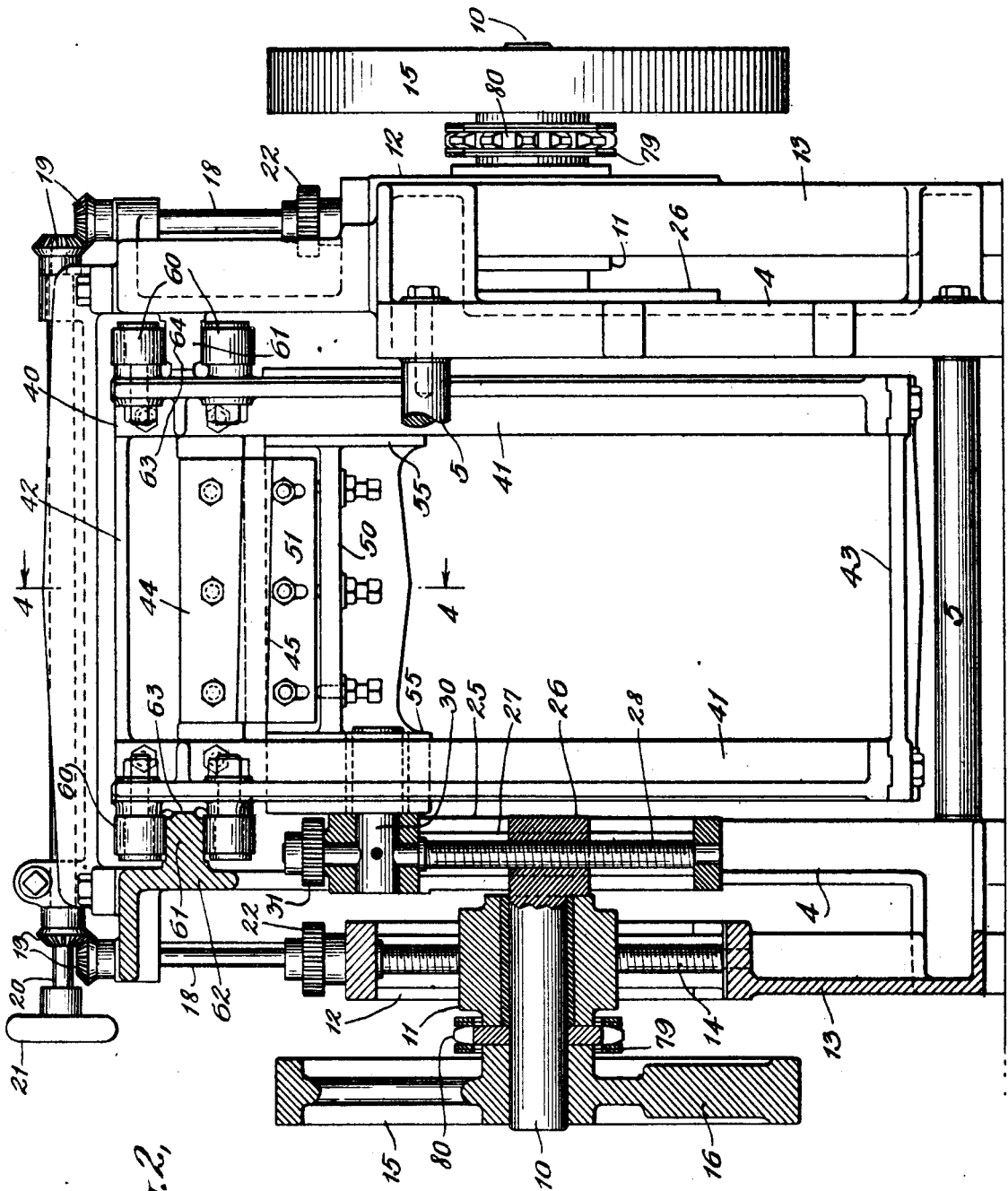

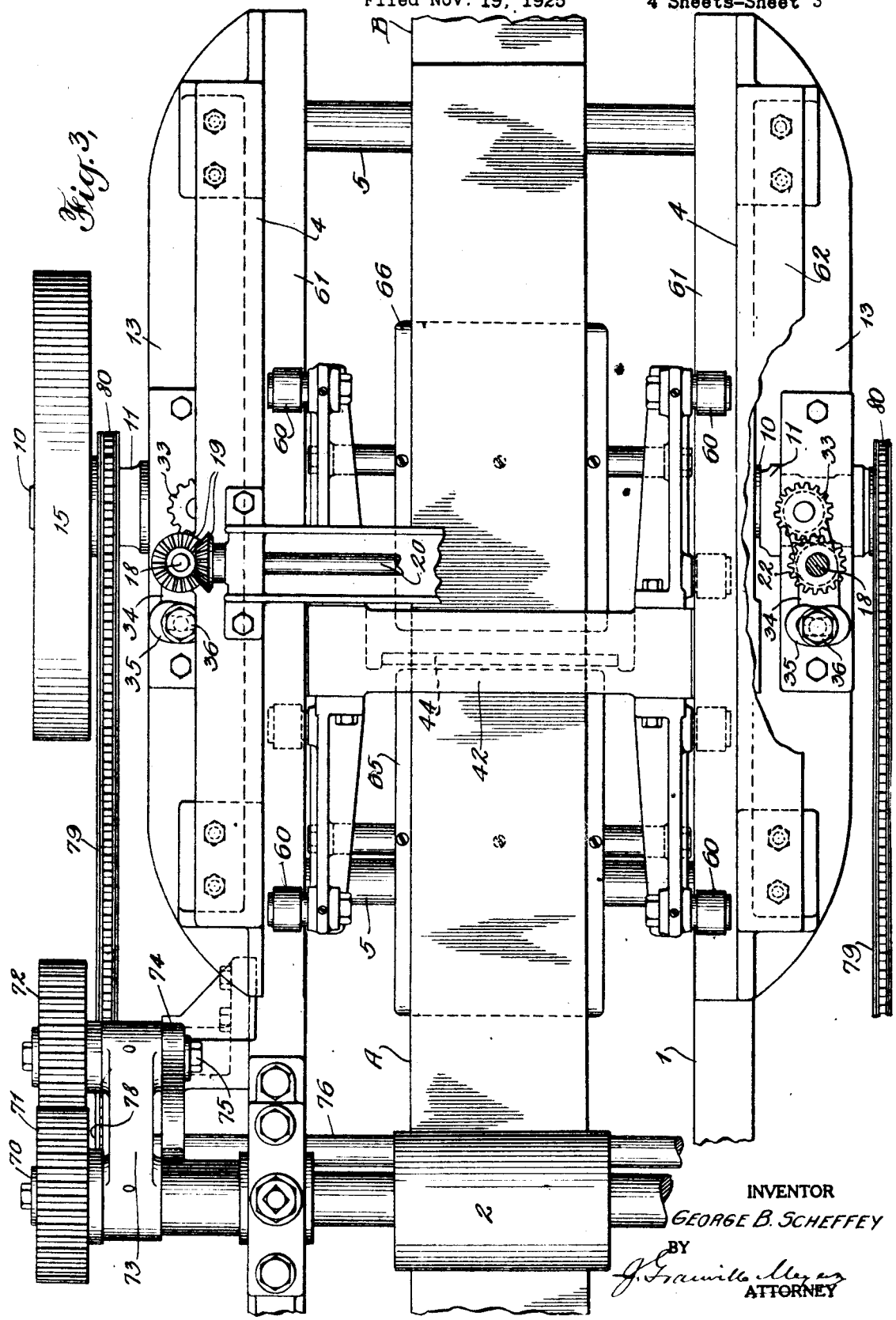

1,624,367

UNITED STATES PATENT OFFICE.

GEORGE B. SCHEFFEY, OF WEEHAWKEN, NEW JERSEY, ASSIGNOR TO WILLIAM LUNSFORD LONG, OF ROANOKE RAPIDS, NORTH CAROLINA.

CUT-OFF MECHANISM.

Application filed November 19, 1925. Serial No. 70,030.

My invention relates to mechanism or machines especially adapted for cutting such material as multi-ply cardboard into lengths in an improved way, but not necessarily limited to such uses.

The invention will be sufficiently explained in describing its embodiment in a machine which is specifically adapted for cutting continuous multi-ply strips of cardboard or like material into lengths to form individual cloth boards or similar articles. In the production of a continuous multi-ply strip conveniently identified as a "continuous assembly", having the cross-sectional shape of the completed boards, it is desirable to advance the assembly continuously and at high speed in order to produce a large output at low cost.

An important object of the present invention is to provide cut-off mechanism which is capable of operating at high speed on such a continuous strip or assembly, to cut it into uniform lengths without retarding the assembly feed. For this purpose mechanism is provided by which the cutting means is caused to travel with the assembly and substantially at the same speed while the cutting operation is performed, with the result that the material is not in any way crumpled or otherwise distorted or injured, and a clean, square cut is produced, leaving the ends of the severed boards in perfect condition. The cut-off means are caused to travel in a more or less circuitous path, approaching and operating upon the material when they travel with it at the same speed, and then being withdrawn and moved rearward in relation to the assembly travel for another advance and cutting operation.

Another object is to make the mechanism readily adjustable for cutting the continuous assembly into pieces of any desired length within a wide range.

The characteristics and advantages of the invention are further sufficiently explained in connection with the following detail description of the accompanying drawings, which show one representative embodiment. After considering this example, skilled persons will understand that many variations may be made, and I contemplate the employment of any structures that are properly within the scope of the appended claims.

In the drawings:

Fig. 1 is a vertical, longitudinal section of mechanism embodying the invention in one form.

Fig. 2 is a transverse section at 2—2, Fig. 1.

Fig. 3 is a top view mainly in plan, but with some parts broken away.

Fig. 4 is a vertical section at 4—4, Fig. 2.

Fig. 5 is a horizontal section at 5—5, Fig. 1.

In Figs. 1 and 3, 1 is a part of the frame at the delivery end of a machine for producing a continuous strip or assembly A, which in this particular instance is a composite or multi-ply strip of cardboard, strawboard or similar material, enclosed in a continuous envelope or wrapper and having a relatively thin or flat rectangular section, with more-or-less smooth or rounded longitudinal edges or corners. The inner structure of the assembly may be substantially solid, as when composed of "solid", flat webs of cardboard or similar fibrous material, or it may be more or less cellular, as when entirely or partly composed of single or multi-ply layers of corrugated or similar fibrous material, with or without one or more layers of solid, flat material. The mechanism of the present invention is adapted to properly and smoothly cut off individual cloth boards of substantially any interior or core structure, including those suggested.

The assembly A issues from the forming machine between rolls 2 which are usually driven continuously at uniform, rapid speed for high output in unit time, and the present mechanism is designed to operate properly on the assembly without interrupting or retarding the feed.

The cut-off mechanism proper in which the present invention is embodied, is built on or about a frame including side uprights 4 and various cross connections, such as 5. The cut-off mechanism frame may be separate and distinct, as shown, or in some cases may be designed as a part of another machine such as the continuous assembly forming machine above referred to. In the present instance the cut-off machine frame is bolted to the main machine frame members 1.

A short or main crank shaft 10 is provided at each side of the frame. These shafts are revolubly mounted in bearing blocks 11 and the blocks are mounted for vertical adjustment in the guideways 12 formed in fixed frame members 13. The bearing blocks are vertically adjusted and so retained by screws 14 which pass through threaded holes in the blocks and are rotatably mounted and held against axial movement by suitable bearings at upper and lower ends of the guide spaces. Desirably, each shaft 10 is provided with a fly wheel 15 of substantial weight, to insure steady running, and the fly wheel may be properly counterweighted as at 16 for proper balance. In some cases the fly wheels may be omitted. Each screw 14 has an upward continuation in the form of a shaft 18, and the two shafts 18 are connected together for convenient adjustment by bevel gears 19 engaging similar gears on a transverse horizontal shaft 20, mounted in suitable bearings on the frame and provided at one end with a hand wheel 21. Each screw or screw shafts also has at a point above the guide-ways, a pinion 22 for adjustment purposes.

Each shaft 10 supports a crank structure which, except for adjusting purposes, might be a simple crank connected to the cutting mechanism or one member thereof. To allow for adjustments, however, as later fully explained, adjustable crank mechanism is provided. Each of these mechanisms includes a yoke or frame 25 embracing a block or hub 26 formed on the inner end of the corresponding shaft 10. The parallel sides of the yoke structure have guide flanges or ribs 27 engaging channels in opposite faces of hub 26 to permit adjustment of the crank yokes in directions transverse the shaft axis. Adjusting screws 28 pass through the hubs 26 and are carried in suitable bearings in the ends of the yoke structure. One end of each yoke supports a crank pin 30. An upward continuation of each screw 28 carries a pinion 31, and these pinions are so located that when the crank yokes are positioned vertically they are in horizontal alignment with the pinions 22 above mentioned. To enable the screws 28 to be rotated for adjustment purposes simultaneously with the screws 14, idler pinions 33 are provided, carried by lever arms 34 pivoted about the axes of shafts 18. One end of each arm is provided with an arcuate slotted portion 35 through which a screw 36 passes to lock the arm against a frame member in either active or idle position. Each pinion 33 is in permanent engagement with one of the pinions 22, and by moving arm 34 it may be thrown into engagement with the adjacent pinion 31 and then rotation of shaft 20 and simultaneous rotation of shafts 18, will adjust each pair of screws 14 and 28 simultaneously, to shift the main or drive shafts 10 vertically and to correspondingly change the crank centers at the same time.

A cutter carriage 40 is arranged for longitudinal reciprocation, that is, for to and fro movement in the line of assembly travel. The carriage includes vertical side members 41 and upper and lower cross connections 42 and 43, respectively. The upper connecting member carries a normally fixed, vertically adjustable cutter blade 44, which has an oblique or diagonal cutting edge 45 to provide a shearing cut. This edge is located slightly above the upper surface of the assembly (Fig. 4) and may be adjusted when necessary, in accordance with the thickness of the assembly. Another cross member 50 is arranged for vertical reciprocation in the carriage. This member carries a removably-mounted lower cutting blade 51 having a thin oblique cutting edge 52 to co-operate with blade 44 in a shearing cut. The cross-piece or movable blade carrier 50 has end guide members or flanges 55 fitting vertical guideways formed on the spaced vertical faces 56 of the vertical yoke members 41. Each crank pin 30 above mentioned has a bearing engagement in one of the ends of the cutter carrier 50.

The carriage is supported and guided by rollers 60 engaging above and below rails 61 provided on upward extensions or brackets 62 of the side frame members 4. The carriage and rolls may also have faces 63 and 64 in sliding engagement to prevent lateral play of the carriage.

Desirably, the carriage has assembly-supporting plates 65 and 66 in line with the lower surface of the assembly A, to properly guide the assembly to the cutters and to support and guide the severed boards B from the cutters to any convenient point of discharge.

The cutting mechanism may be driven in various ways. In the present example it is conveniently driven directly from the main machine, indicated by the frame members 1 and rolls 2. For this purpose, the shaft 70 of one of the rolls, such as the lower roll 2, carries at each end a pinion 71 engaging an idler gear 72. These idlers are carried by arms 73 centered about the axis of shaft 70 and are secured in adjusted position by arcuate slot members 74 and screws 75. Below shaft 70 a transverse shaft 76 is mounted in frame members 1, and is provided with removable and interchangeable gears 77 of different sizes to co-operate with the adjustable idlers 72. At each end, shaft 76 has a sprocket 78 connected by a chain 79 to the sprocket 80 on main drive shaft 10 at the corresponding side of the machine.

Whenever the main machine is running the cut-off mechanism is driven by the described gear and chain connections. Shafts 10 are thus simultaneously rotated at a constant speed, any material speed variation being prevented by the fly wheels 16 or otherwise. As the shafts 10 revolve, the crank yokes 25 are rotated and the crank pins 30 move in circular paths. By the engagement of the cross piece or movable cutter carrier 50 in the vertical guide ways of the carriage, the carriage is thus reciprocated at constantly varying speeds and the movable cutter 51 moves in a circular path along with the crank pins, at the same time moving vertically in relation to the carriage. Thus, when the crank pins 30 are at a left-hand horizontal position, as viewed in Fig. 1, the carriage is stationary, but as the crank pin revolves farther upward or forward in the right hand direction of rotation of the main shafts, the carriage is started and rapidly accelerated in the direction of assembly travel, while the lower cutter blade 51 is elevated. Just before the cutting edge of the lower cutter strikes the moving assembly or composite web, it, and the upper cutter 44, which has only a reciprocating movement along with the carriage, are moving substantially or identically at assembly speed, and while so moving the lower blade cuts through the assembly with a shearing cut, producing an individual cloth board B, Fig. 4. In this action the forward end of the continuous assembly A is pressed up against the flat lower face of the upper cutter 44. This end also abuts against the vertical rear face of the lower cutter 51 but without any crumping action, because the cutter is then moving as fast as the web or slightly faster, by means explained below.

Before the carriage loses horizontal speed to any appreciable extent, the lower cutter is withdrawn, and the continuous assembly A is free to advance without interference by the cutter as the carriage slows down. The cycle of operations is completed and repeated indefinitely in an obvious way.

To insure that the cutters will move at least as fast as the assembly, it may be desirable in some cases to provide means by which they actually move slightly faster than the assembly at the moment of cutting. For this purpose the gears 77 provided for any particular length of board may have one more tooth than would be necessary to drive the cutters at the moment of cutting, at exactly the assembly speed. In this way the cutters have a slight "lead", or gain in speed in comparison with the assembly at the instant of cutting and any bumping or retardation of the assembly by contact with the lower cutter is definitely prevented.

The machine may be quickly adjusted by any reasonable length of board in the following way: The fly wheels 16 are turned so that screws 28 are vertical as shown in Figs. 2 and 5. Screws 28 and 14 are then in vertical alignment, and pinions 22 and 31 at each side of the machine are in horizontal alignment; screws 36 are then loosened and levers 34 are swung to engage pinions 33 with pinions 31. Hand wheel 21 is then rotated and all the screws are simultaneously rotated to adjust the centers of shafts 10 vertically and to adjust the crank yokes 25 vertically, to the same degree. At the same time gears 77 are removed and other gears are substituted of proper size to give the proper drive or speed ratio, and idlers 72 are readjusted. The adjustment of the crank yokes mainly effects the adjustment for the cutting interval or in other words, for the desired length of cloth board, and the vertical adjustment of shafts 10 proper repositions the lower cutter, in view of the change in crank throw. The required variations in the length of the driving chains 79 may be allowed for by providing substantial slack in the chains and applying idlers 90 to the slack sides of the chains, or in any other convenient way.

The provision of the driving and adjusting mechanism in duplicate at opposite sides of the machine represents only one convenient arrangement, and is adopted, among other reasons, in this particular embodiment, to avoid other or different cross-connections which might be more complicated than the present arrangement. The invention, however, in its broader aspect is not limited to such a duplicate driving and adjusting arrangement and in fact in this and various other respects many variations or modifications may be made, too numerous to mention. These are all contemplated by the scope of the claims which follow:

I claim:

1. Cutting mechanism comprising a carriage, a cutter thereon, guides supporting the carriage for reciprocation, a rotary driver, a crank member connected to the driver, another cutter connected to the crank member, and a connection from the crank member to the carriage whereby the carriage is reciprocated while said other cutter is moved in a circular path to co-operate with the first named cutter.

2. Cutting mechanism comprising a carriage, a cutter thereon, means supporting the carriage for reciprocation, a rotary driver, an adjustable crank thereon, another cutter connected to the crank, and a connection between the crank and the carriage to reciprocate the latter as the crank revolves.

3. Cutting mechanism comprising a carriage, a cutter thereon, means supporting the carriage for reciprocation, a rotary driver, an adjustable crank thereon, another cutter connected to the crank, a connection between the crank and the carriage to reciprocate the latter as the crank revolves, and means for adjusting the crank throw.

4. Cutting mechanism comprising a carriage, a cutter thereon, means supporting the carriage for reciprocation, a rotary driver, an adjustable crank thereon, another cutter connected to the crank, a connection between the crank and the carriage to reciprocate the latter as the crank revolves, and means for adjusting the driver axis toward and from the line of carriage movement.

5. Cutting mechanism comprising a carriage, a cutter thereon, means supporting the carriage for reciprocation, a rotary driver, an adjustable crank thereon, another cutter connected to the crank, a connection between the crank and the carriage to reciprocate the latter as the crank revolves, and means for simultaneously adjusting the crank throw and the driver axis.

6. In combination with a machine for producing or advancing a strip of material for cutting, cutting mechanism including a reciprocating cutter, a rotating cutter, means for driving the rotating cutter from said machine, and means by which the rotary cutter driving means also impels the reciprocating cutter.

7. In combination with a machine for producing or advancing a strip of material for cutting, cutting mechanism including a reciprocating cutter, a rotating cutter, means for driving the rotating cutter at adjustable ratios from said machine, and means by which the rotary cutter driving means also impels the reciprocating cutter.

8. In mechanism of the class described, a reciprocating cutter, a rotary driver, a crank structure mounted for adjustment transverse the driver axis a rotary cutter carried by the crank structure, and means interconnecting the crank structure and the reciprocating cutter.

9. In mechanism of the class described, a reciprocating cutter, a rotary driver, a crank structure mounted for adjustment transverse the driver axis, a rotary cutter carried by the crank structure, means interconnecting the crank structure and reciprocating cutter, adjusting means mounted in a fixed position with relation to the movable crank structure, and means for connecting the adjusting means to adjust the crank structure when the latter is in a stationary position.

10. In mechanism of the class described, a reciprocating cutter, a rotary driver, a crank structure mounted for adjustment transverse the driver axis, a rotary cutter carried by the crank structure, means interconnecting the crank structure and reciprocating cutter, adjusting means mounted in a fixed position with relation to the movable crank structure, means for connecting the adjusting means to adjust the crank structure when the latter is in a stationary position, and means for simultaneously adjusting the axis of the driver.

11. In co-operation with a machine for producing or advancing a strip of material to be cut, cutting mechanism including a reciprocating cutter and a co-operating rotary cutter, means for driving the rotary cutter and simultaneously driving the reciprocating cutter, and means for adjusting the driving means and the travel of the rotary cutter to vary the cutting action in relation to a definite rate of movement of the material to be cut.

12. In combination with a machine for continuously advancing a strip of material for cutting, cutting mechanism including a reciprocating cutter, a rotating cutter, means for driving the rotating cutter from said machine, and means by which the rotary cutter driving means also impels the reciprocating cutter so that the cutters co-operate to cut the strip while advancing with it at substantially the same speed.

13. In co-operation with a machine for continuously advancing a continuous assembly, cutting mechanism including a reciprocating cutter and a co-operating rotary cutter, means for driving the rotary cutter and simultaneously driving the reciprocating cutter, so that they act in the assembly while moving therewith at substantially the same speed, and means for adjusting the driving means and the travel of the rotary cutter to vary the cutting action in relation to a definite rate of movement of the material to be cut.

Signed at New York city, in the county of New York and State of New York, this 16th day of November, A. D. 1925.

GEORGE B. SCHEFFEY.